March 9, 1948.                J. N. WOLFRAM                2,437,632
                              COUPLING FOR TUBES
                              Filed Nov. 13, 1944
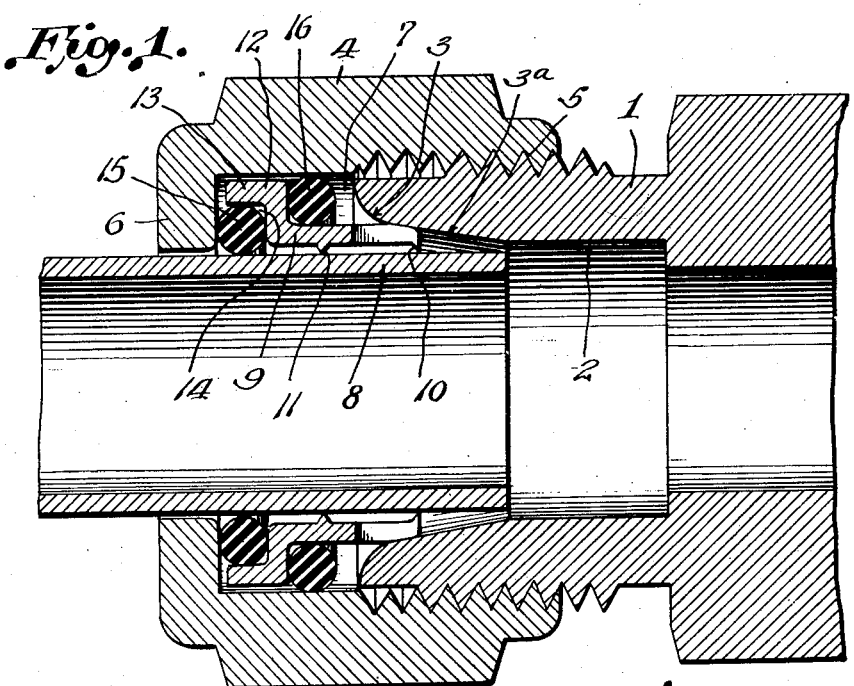
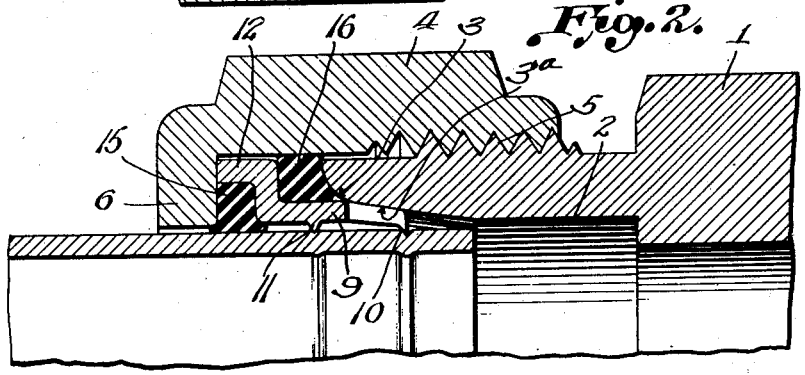
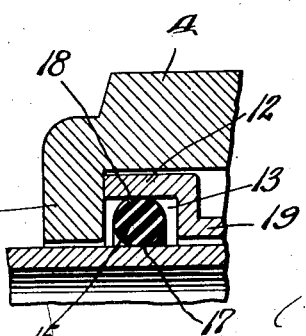
Inventor
John N. Wolfram
By Mason, Porter T Diller
Attorney Patented Mar. 9, 1948

2,437,632

UNITED STATES PATENT OFFICE 2,437,632

COUPLING FOR TUBES

John N. Wolfram, Cleveland, Ohio, assignor to The Parker Appliance Company, Cleveland, Ohio, a corporation of Ohio Application November 13, 1944, Serial No. 563,173

3 Claims. (Cl. 285—122)

The invention relates to new and useful improvements in a coupling for tubes.

An object of the invention is to provide a coupling wherein a metal sleeve makes contact with the tube for holding it in the coupling, which sleeve is so shaped that a double seal may be obtained by the use of deformable sealing gaskets, one of which is on one side of the sleeve and the other is on the other side thereof so as to ensure a more perfect seal for the coupling and one which can be obtained by relatively light torque pressure.

In the drawings,

Figure 1 is a longitudinal sectional view through a coupling embodying the improvements with the nut joined to the body member by a finger tightness;

Figure 2 is a view similar to Figure 1 but showing the coupling fully closed and sealed;

Figure 3 is a view showing a portion of the coupling with a modified construction of sleeve.

The coupling includes a body member 1 which is provided with a bore 2, the wall of which is tapered outwardly and terminates in a rounded face 3. The tapered portion, together with the rounded face forms a camming surface 3a, the purpose of which will be hereinafter described. The coupling also includes a nut 4 having a threaded connection 5 with the body member 1. While this threaded connection is shown as external of the body member, it will be obvious that it may be otherwise formed. The nut 4 has an inwardly extending flange 6 which is spaced away from the end of the body member so as to provide a recess 7.

The tube as shown in Figures 1 and 2 of the drawing, is flareless and is indicated at 8. Disposed in this recess in the nut between the flange of the nut and the body member is a holding sleeve 9. This holding sleeve at its inner end is provided with longitudinal slits which greatly facilitates the ease with which the inner end of the sleeve is contracted. At the inner end of these gripping sections formed by the slitting of the sleeve are teeth 10 which bite into the tube. The sleeve is also provided midway of its length with teeth 11 which will likewise grip into the tube when the sleeve is contracted in this region. The inner end of the sleeve projects into the bore 2 and contacts with the camming surface 3a. It will be readily noted that if the sleeve is positively moved into the bore this camming surface will contract the gripping sections and they will bite into the tube as shown in Figure 2 of the drawings. This makes a very tight grip between the sleeve and the tube which will hold the tube firmly in the coupling against any pulling-out strain that may be imposed thereon.

The sleeve is provided with a radially extending section 12 at the outer periphery of which is a laterally projecting cylindrical portion 13. This laterally projecting cylindrical portion 13 provides a recess 14 in which is placed a ring member 15. This ring-shaped member 15 is preferably initially circular in cross section. It is made of any suitable deformable material such as rubber or the like. The ring member is dimensioned so that its inner diameter is slightly less than the outer diameter of the tube so that when the ring is slipped onto the tube it will make a fairly firm gripping engagement therewith. The ring member is also so dimensioned that it projects from the recess as shown in Figure 1 of the drawings.

This will initially space the end of the cylindrical portion 13 away from the flange 6 when the flange first contacts with the outer face of the deformable ring gasket 15. This offset portion 12 in the sleeve provides a gasket receiving recess on the outer side of the sleeve. A ring gasket 16 is placed in this last-named recess. The gasket is so dimensioned that it initially contacts with the outer face of the sleeve and also with the inner face of the nut. In assembling the parts the nut is first placed on the tube, then the gasket 15 is placed over the tube, after which the sleeve with the gasket 16 thereon is slipped onto the tube.

In Figure 1 the nut is shown as in engagement with the threads on the body member and turned to a finger-tight position. This will bring the flange 6 into contact with the gasket 15 and it will force the sleeve against the camming surface so that the inner end of the sleeve will be contracted. When the nut is turned onto the body member to the extent shown in Figure 2, it will be noted that the inner end of the sleeve will be further contracted as it moves along the camming surface and this will cause the cutting edges 10 to bite into the tube to such an extent that the tube will be firmly held in the coupling against any pulling-out strain. The sleeve will also be contracted to some extent in the region of the cutting teeth 11 and these will also bite into the tube.

This closing of the coupling causes the flange 6 to deform the gasket 15 and make contact with the sleeve 9 so that the sleeve is positively forced along the camming surface and the cutting edges will be positively forced into the tube. This deforming of the gasket 15 will fill the recess and close up any space between the tube and the flange and also any space between the tube and the sleeve and produce a tight seal against any fluid escaping between the coupling and the tube and out through the opening between the flange on the nut and the tube. Both of these openings or passages are comparatively small in size so that the deformable gasket cannot possibly be extruded out through the passage between the nut and the tube.

Closing the coupling will also force the deformable ring gasket 16 against the end of the body member and said gasket will be deformed into tight fluid engagement not only with the sleeve and the body member, but likewise with the nut. When the recess is filled with the deformable material 16 as shown in Figure 2, it will in a sense become a stop for preventing further tightening of the nut and the collapsing of the tube through the contraction of the inner end of the sleeve.

From the above it will be apparent that a coupling has been provided wherein a very firm grip can be obtained on the tube for holding it in the coupling by a relatively light turning torque applied to the nut. The inner end of the sleeve as noted, has been provided with slits extending longitudinally into the sleeve and this will enable the gripping portions of the sleeve between the slits to contract easily through the closing up of the slits. It will also be noted that there is a double seal for the coupling, one of which is at the inner side of the sleeve and the other at the outer side of the sleeve. This also enables a very tight seal to be formed with comparatively light turning torque applied to the nut.

In Figure 3 of the drawings the nut 4 is provided with the usual flange 6 and the sleeve 9 with an offset cylindrical portion 12 providing a recess 13 such as described above. In this recess is a deformable gasket 15. In this form of the sleeve the cylindrical portion 12 is of greater length than the diameter of the gasket. The gasket is dimensioned so that the inner diameter thereof is slightly less than the outer diameter of the tube and therefore the gasket when placed on the tube, will make a very tight sealing engagement with the tube in the region indicated at 17. The gasket is also of slightly larger external diameter than the internal diameter of the cylindrical portion 12 of the sleeve. Therefore, the gasket will make a very tight sealing engagement with the sleeve in the region indicated at 18. With this form of the invention the gasket 15 is not deformed through any contact with the nut therewith. However, the joint between the sleeve and the tube is efficiently sealed by this gasket which is deformed by the insertion of the same on the tube and into the recess at the end of the sleeve so as to bring about this liquid-tight seal.

It is obvious that minor changes in the details of construction may be made without departing from the spirit of the invention as set forth in the appended claims.

I claim:

1. A coupling for tubes comprising a body member, a nut having a threaded engagement with said body member, said nut having a flange provided with an opening through which the tube extends into the coupling, the flange in the nut being spaced away from the body member, said body member having a bore to receive the tube end which bore is tapered toward the outer end to provide a camming surface, a sleeve disposed in the nut and having the inner end thereof extending into the bore and contacting with said camming surface, the inner end of said sleeve being provided with slits extending longitudinally of the sleeve and with a cutting edge at the inner end of the gripping sections formed by the longitudinal slits whereby when said sleeve is forced against the camming surface by the nut, the inner end of the sleeve will be easily contracted and the cutting edge caused to bite into the tube, and a plurality of deformable sealing gaskets one of which is located between the sleeve and the tube and the other of which is located between the sleeve and the nut for sealing the connection of the tube to the coupling.

2. A coupling for tubes comprising a body member, a nut having a threaded engagement with said body member, said nut having a flange provided with an opening through which the tube extends into the coupling, the flange in the nut being spaced away from the body member, said body member having a bore to receive the tube end which bore is tapered toward the outer end to provide a camming surface, a sleeve disposed in the nut and having the inner end thereof extending into the bore and contacting with said camming surface, the inner end of said sleeve being provided with slits extending longitudinally of the sleeve and with a cutting edge at the inner end of the gripping sections formed by the longitudinal slits whereby when said sleeve is forced against the camming surface by the nut, the inner end of the sleeve will be easily contracted and the cutting edge caused to bite into the tube, said sleeve at the outer end thereof having an offset cylindrical portion providing a recess at its inner face, a deformable gasket disposed in said recess and adapted to be engaged by the flange of the nut whereby said gasket is deformed so as to fill the recess and seal the connection between the sleeve, the nut and the tube, said cylindrical portion being dimensioned so as to be engaged by the flange of the nut when the gasket is deformed for positively forcing the sleeve endwise against the camming surface.

3. A coupling for tubes comprising a body member, a nut having a threaded engagement with said body member, said nut having a flange provided with an opening through which the tube extends into the coupling, the flange in the nut being spaced away from the body member, said body member having a bore to receive the tube end which bore is tapered toward the outer end to provide a camming surface, a sleeve disposed in the nut and having the inner end thereof extending into the bore and contacting with said camming surface, the inner end of said sleeve being provided with slits extending longitudinally of the sleeve and with a cutting edge at the inner end of the gripping sections formed by the longitudinal slits whereby when said sleeve is forced against the camming surface by the nut, the inner end of the sleeve will be easily contracted and the cutting edge caused to bite into the tube, said sleeve at the outer end thereof having an offset cylindrical portion providing a recess at its inner face, a deformable gasket disposed in said recess and adapted to be engaged by the flange of the nut whereby said gasket is deformed so as to fill the recess and seal the connection between the sleeve, the nut and the tube, said cylindrical portion being dimensioned so as to be engaged by the flange of the nut when the gasket is deformed for positively forcing the sleeve endwise against the camming surface, a second deformable sealing gasket disposed outside of said sleeve and adapted to be deformed by said sleeve for forcing said gasket against the end of the body member so as to fill the recess between the sleeve, the nut and the end of the body member.

JOHN N. WOLFRAM.

REFERENCES CITED

The following references are of record in the file of this patent:

UNITED STATES PATENTS

| Number | Name | Date |
|---|---|---|
| 2,301,280 | Howe | Nov. 10, 1942 |
| 2,365,747 | Cowles | Dec. 26, 1944 |

FOREIGN PATENTS

| Number | Country | Date |
|---|---|---|
| 699,641 | Germany | Nov. 7, 1940 |